(12) United States Patent
Wang et al.

(10) Patent No.: US 10,487,860 B2
(45) Date of Patent: Nov. 26, 2019

(54) METHOD TO AUTOMATICALLY DETECT THE AREA RATIO OF AN ACTUATOR

(71) Applicant: Eaton Corporation, Cleveland, OH (US)

(72) Inventors: Meng Wang, Eden Prairie, MN (US); Michael Berne Rannow, Eden Prairie, MN (US); Jason Kraft, Stillwater, MN (US); Shelley Allison Nation, Bloomington, MN (US)

(73) Assignee: Eaton Intelligent Power Limited, Dublin (IE)

( * ) Notice: Subject to any disclaimer, the term of this patent is extended or adjusted under 35 U.S.C. 154(b) by 162 days.

(21) Appl. No.: 15/808,311

(22) Filed: Nov. 9, 2017

(65) Prior Publication Data

US 2018/0128607 A1 May 10, 2018

Related U.S. Application Data

(60) Provisional application No. 62/419,540, filed on Nov. 9, 2016, provisional application No. 62/419,537, filed on Nov. 9, 2016, provisional application No. 62/419,569, filed on Nov. 9, 2016.

(51) Int. Cl.
| | |
|---|---|
| *F15B 19/00* | (2006.01) |
| *F15B 13/04* | (2006.01) |
| *G01F 1/36* | (2006.01) |
| *F15B 11/00* | (2006.01) |

(Continued)

(52) U.S. Cl.
CPC .......... *F15B 19/002* (2013.01); *F15B 19/00* (2013.01); *F15B 19/005* (2013.01); *F15B 11/006* (2013.01); *F15B 13/0417* (2013.01); *F15B 19/007* (2013.01); *F15B 21/087* (2013.01); *F15B 2013/0409* (2013.01); *F15B 2211/20546* (2013.01); *F15B 2211/30575* (2013.01); *F15B 2211/455* (2013.01); *F15B 2211/46* (2013.01); *F15B 2211/634* (2013.01); *F15B 2211/6313* (2013.01); *F15B 2211/6346* (2013.01); *F15B 2211/6656* (2013.01); *F15B 2211/7053* (2013.01); *F15B 2211/7058* (2013.01); *F15B 2211/761* (2013.01); *F15B 2211/855* (2013.01); *F15B 2211/857* (2013.01); *F15B 2211/87* (2013.01); *G01F 1/36* (2013.01); *G01F 15/005* (2013.01)

(58) Field of Classification Search
CPC combination set(s) only.
See application file for complete search history.

(56) References Cited

PUBLICATIONS

K Jain et al 1993 Meas. Sci. Technol. 4 249 (Year: 1993).*

* cited by examiner

*Primary Examiner* — Nathaniel J Kolb
(74) *Attorney, Agent, or Firm* — Merchant & Gould P.C.

(57) ABSTRACT

Systems and methods for estimating the area ratio of an actuator in static and dynamic states are disclosed. In one aspect, a metering valve is connected to each side of the actuator. In one example, one metering valve is held closed while the other metering valve incrementally pressurizes the actuator in discrete steps. The resulting work port pressures can be used to determine the actuator area ratio. Where counterbalance valves are installed in the system, the pressurizing metering valve can be placed in a pressure control mode to obtain the desired pressure values. In one example, the ratio of flows through each metering valve is used to determine the actuator ratio.

8 Claims, 12 Drawing Sheets

(51) Int. Cl.
*G01F 15/00* (2006.01)
*F15B 21/08* (2006.01)

Head diameter = 19cm
Rod diameter = 8.8cm

| True value | D=4, L=1 Air=5%, Temp=40 | D=19, L=40 Air=5%, Temp=40 | D=11, L=20 Air=2%, Temp=40 | D=11, L=20 Air=10%, Temp=40 | D=11, L=20 Air=5%, Temp=10 | D=11, L=20 Air=10%, Temp=40 | D=11, L=20 Air=5%, Temp=90 |
|---|---|---|---|---|---|---|---|
| 1.273 | 1.273 | 1.273 | 1.273 | 1.273 | 1.273 | 1.273 | 1.273 |

Hose Dia: 4mm-19mm    Bulk modulus air: 2%-10%
Hose length: 1m-40m    Temp: 10deg-90deg C

FIG. 12

| | Area ratio | |
|---|---|---|
| | $A_h/A_r$ w/o CBV | $A_h/A_r$ w/ CBV |
| True | 1.5412 | 1.5412 |
| Estimation | 1.5412 | 1.5387 |
| Est. error [%] | 0 | 0.16% |

METHOD TO AUTOMATICALLY DETECT THE AREA RATIO OF AN ACTUATOR

RELATED APPLICATIONS

This application claims priority to U.S. Provisional Patent Application Ser. No. 62/419,537, filed on Nov. 9, 2016, the entirety of which is incorporated by reference herein. This application also claims priority to U.S. Provisional Patent Application Ser. No. 62/419,540, filed on Nov. 9, 2016, the entirety of which is incorporated by reference herein. This application further claims priority to U.S. Provisional Patent Application Ser. No. 62/419,569, filed on Nov. 9, 2016, the entirety of which is incorporated by reference herein.

BACKGROUND

Work machines, such as off-highway vehicles, fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. Electro-hydraulic valves often rely on sensed values, such as port pressure and/or valve position to provide a stable, controlled flow to and from a hydraulic actuator, such as a linear actuator or motor. During initial installation of a new valve or actuator, when a new valve assembly is installed, or when a work implement is changed, calibration of the assembly is required.

SUMMARY

The disclosed systems and methods provide methods for estimating the area ratio of an actuator. In one example, A method for estimating the area ratio of an actuator connected to a first metering valve on a first side of the actuator and a second metering valve on a second side of the actuator, the method comprising the steps of: preventing the actuator from moving; holding the first metering valve in a closed position; opening the second metering valve to pressurize the actuator to a first pressure; closing the second metering valve; recording the pressure at the first and second sides of the actuator; opening the second metering valve to pressurize the actuator to a second pressure; closing the second metering valve; recording the pressure at the first and second sides of the actuator; and calculating the area ratio of the actuator based on the recorded pressures.

In one example, a method for estimating the area ratio of a moving actuator connected to a first metering valve on a first side of the actuator and a second metering valve on a second side of the actuator is disclosed. The method can include the steps of: calculating a first flow through the first metering valve; calculating a second flow through the second metering valve; and calculating an area ratio of the actuator based on the ratio of the calculated first and second flows of the first and second metering valves.

In one example, a method can include the steps of: opening the first and second metering valves to respectively charge a first and second work port on each side of the actuator to a minimum pressure; recording work port pressures once the pressure equalizes on each side of the actuator; determining a load holding side of the actuator based on the recorded work port pressures; pressurizing the load holding side of the actuator with the metering valve associated with that side of the actuator; designating a reference pressure set point for the metering valve associated with the load holding side; regulating the metering valve associated with the load holding side to meet a pressure set point equal to the recorded work port pressure plus a pressure differential while holding the other metering valve in a closed position; recording work port pressures; and calculating the area ratio of the actuator based on the recorded work port pressures.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 12 is a table showing simulation results from the application of the method of FIG. 6 with and without the presence of counterbalance valves.

DETAILED DESCRIPTION

Figure 1:
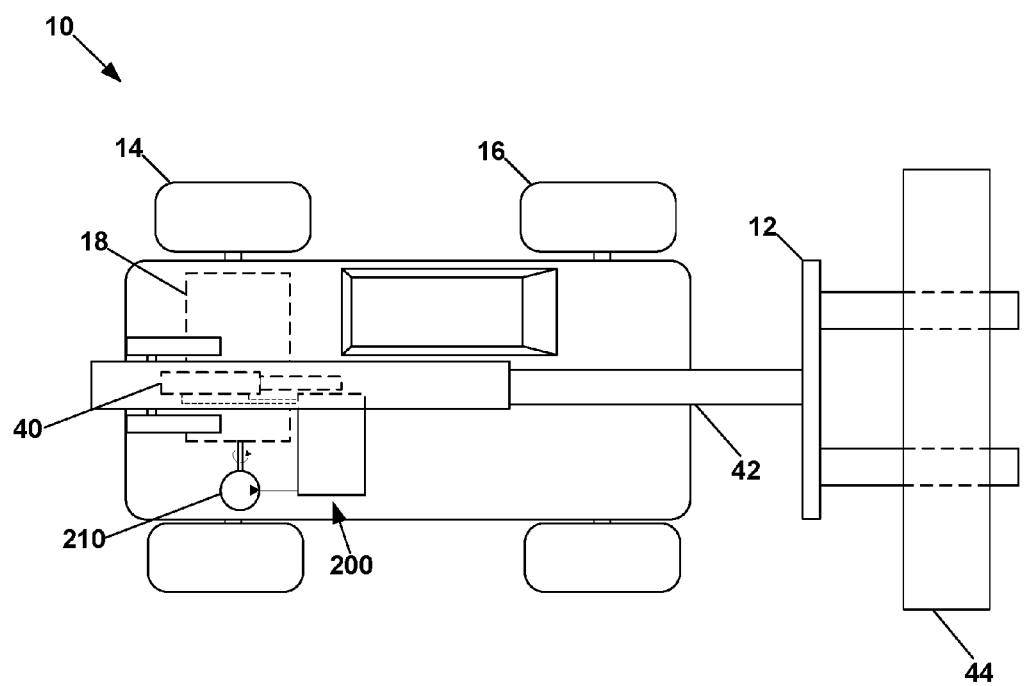
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Certain key parameters related to control system applications need to be commissioned in associated valve assemblies to achieve premier valve performances. To properly control in the meter in/meter out flows, the area ratio of the actuator attached to the valve is required. This information is also utilized to determine the loading conditions of the associated actuators (e.g. passive vs. overrunning). An example valve assembly manufactured by the assignee of this application is the Eaton CMA Advanced Mobile Valve with Independent Metering (e.g. models CMA 90, CMA 200). Some valve assemblies, such as the CMA valve assembly, include functions to intelligently control the valve's attached actuator. Compared with traditional mobile valves, the commissioning for advanced mobile valves is not routine. Manual commissioning of the valve is costly and time consuming. In addition, it is also challenging to guarantee a robust and consistent commissioning accuracy. Therefore, an automatic commissioning method is preferred for the valve to automatically detect the area ratio of the actuator attached to it.

This disclosure includes proposed methods for auto-commissioning, including procedures to automatically detect the area ratio of the actuator attached to the advanced mobile valve by performing an automated test. In the examples shown, the advanced mobile valve consists of a pair of three position, three way independent metering valves. Each valve is equipped with valve spool position sensor, and pressure sensors at its work port. In addition, the valve can also measure the flow crossing it. The also valve has signal processing/calculation capabilities. Notably, the auto-commissioning test does not require additional sensors or ECUs (no hardware is required). The detail auto-commissioning procedures are described in the attached file.

Descriptions of the system in general, the hydraulic systems, the related control systems, and the aforementioned auto-commissioning methods follow.

General System Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a hydraulic system including a work circuit 200 and a steering circuit (not shown) of the work machine 10 via at least one hydraulic pump 210. In one embodiment, pump 32 is mechanically coupled to the engine 18, such as by an output shaft or a power take-off. In one embodiment, pump 32 is powered indirectly by the engine 18 via a hydraulic system. The work circuit 200 actuates the work attachment 12 by operation of the pump in cooperation with a number of hydraulic actuators 40 and control valves 20, 120. In one embodiment, the work machine includes hydraulic actuators and valves for effectuating lifting, extending, tilting, and sideways motions of the work attachment 12.

Hydraulic System

Figure 2:
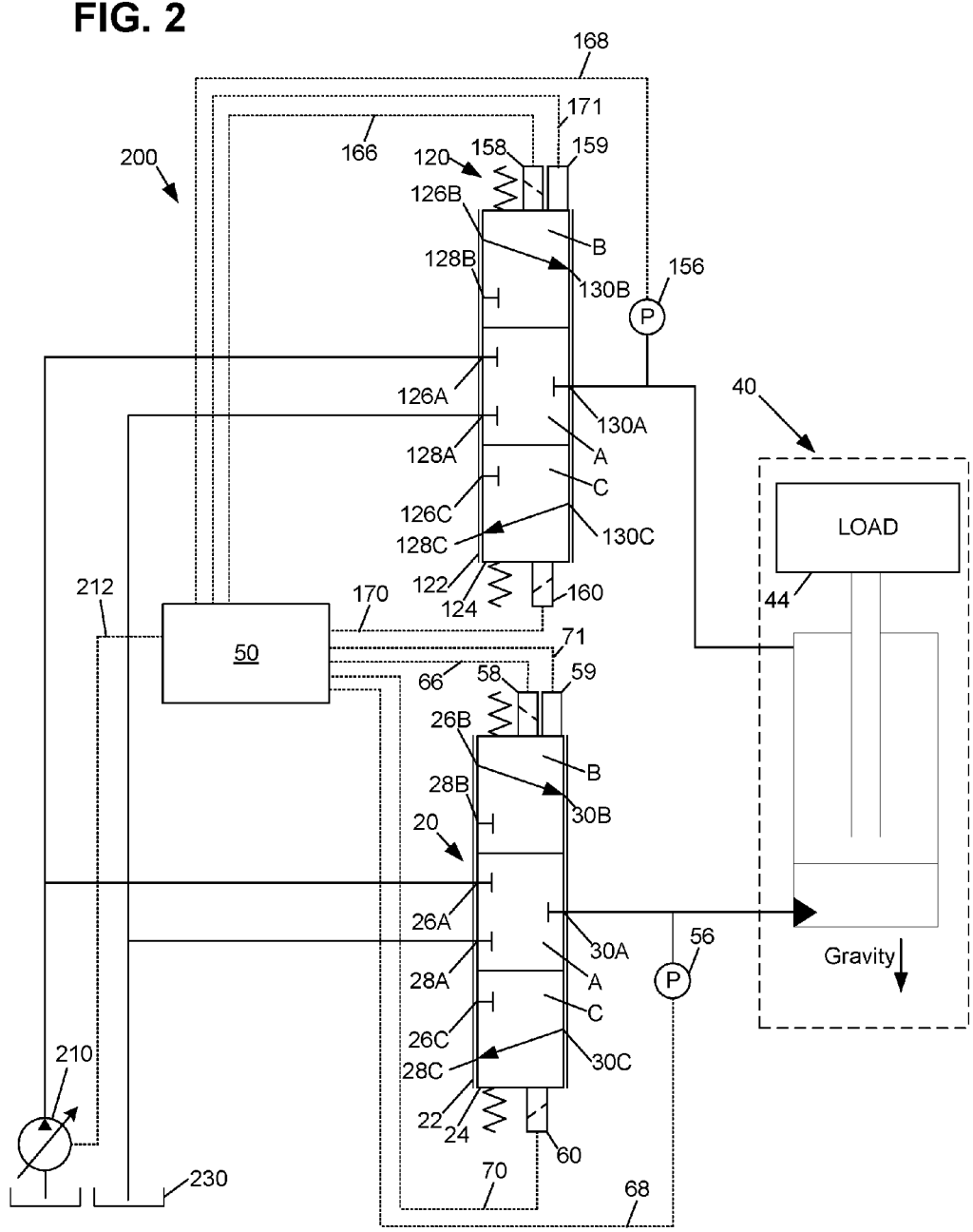
FIG. 2 is a schematic view of a portion of an electro-hydraulic system including a work circuit and actuator suitable for use in the work machine shown in FIG. 1.

Referring to FIG. 2, an example of a hydraulic system including a work circuit 200 and other components are shown. Work circuit 200 is for activating a work attachment of a work machine. As shown, work circuit 200 includes a first valve assembly 20 and a second valve assembly 120 for enabling a work function, such as an attachment lift function. Work circuit 200 may also include a plurality of additional valves and/or fluid power consuming components for enabling other functions in the hydraulic system. Furthermore, the work circuit may include a single valve assembly that combines the functions of the first and second valve assemblies 20, 120. In the particular embodiment shown, the first and second valve assemblies 20, 120 are proportional valves having a sleeve 22, 122 within which a spool 24, 124 is disposed.

Figure 2A:
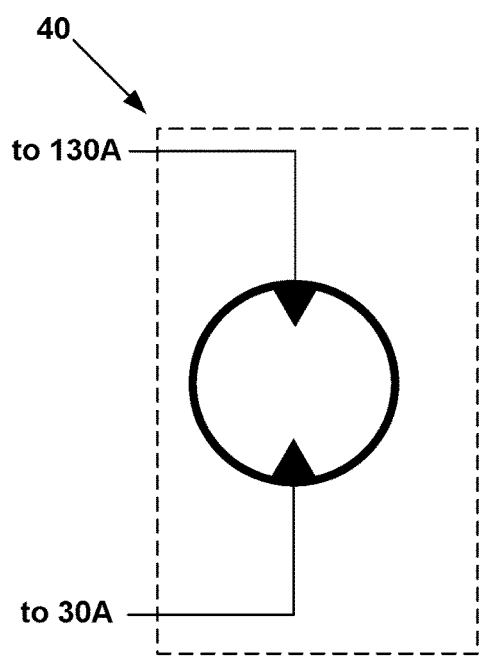
FIG. 2A is a schematic of a hydraulic motor usable within the system shown in FIG. 2.

The first valve assembly 20 is configured and arranged to selectively provide pressurized fluid from pump 210 to one or more actuators 40 are shown. In the particular example presented, the actuator 40 is a hydraulic lift or work cylinder 40 mechanically coupled to the work attachment. Although cylinders 40 are characterized in this disclosure as being lift cylinders, it should be understood that cylinders 40 may be any type of work cylinder, and that the disclosure is not limited to only applications involving lift cylinders. Additionally, any type of actuator or combinations thereof may be used, for example, linear hydraulic actuators and motors. An example of a hydraulic actuator 40 that is a motor 40 usable with the disclosed concepts herein is presented at FIG. 2A. The operation of first valve assembly 20 causes the work attachment 12 to be selectively raised or lowered in a lifting function. The lifting speed of the lift cylinder(s) 40 is a result of the flow through the first valve assembly 20. Flow through the first valve assembly 20 can be controlled by a pair of variable solenoid actuators 58, 60 acting on each end of the spool 24 of the valve 20. The variable solenoid actuators 58, 60 can be operated by the control system 50 via control lines 66, 70, respectively. Additionally where solenoids or solenoid actuators are referenced in the application, it should be noted that the associated valves could be voicecoil driven valves. Additionally, multi-stage valves incorporating a main stage valve that is pilot operated by valves utilizing solenoids and/or voicecoils may be used.

As shown, the first valve assembly 20 is a three-position, three-way valve in fluid communication with the pump 210, a tank reservoir 230, and the lift cylinder(s) 40. In the embodiment shown, first valve assembly 20 is movable from a closed or neutral position A, to a lifting position B, and to a lowering position C.

In the closed position A, ports 26A, 28A, and 30A are closed such that the pump 210 and tank reservoir 230 are both isolated from the lifting cylinder(s) 40. In this position the work attachment 12 is held in a static position and can be neither raised nor lowered.

In the lifting position B, the first valve assembly 20 is positioned such that ports 26B and 30B are placed in fluid communication with each other. This position allows for the pump 210 to be placed in fluid communication with the lifting cylinder(s) 40. Where the pump pressure exceeds the pressure induced by a load 44, the hydraulic lift cylinder(s) will cause the load 44 to be raised. In the lifting position, the tank reservoir 230 is blocked at port 28B.

In the lowering position C, the first valve assembly 20 is positioned such that ports 28C and 30C are placed in fluid communication with each other. This position allows for the tank reservoir 230 to be placed in fluid communication with the lifting cylinder(s) 40. The lowering position C allows for fluid to drain from the lifting cylinder(s) 40 to the tank reservoir 230, thereby allowing for the load 44 to be lowered.

The second valve assembly 120 is configured and arranged to selectively provide fluid communication between the pump 210 or reservoir 230 and one or more hydraulic lift or work cylinders 40 which are mechanically coupled to the work attachment. The operation of second valve assembly 120 allows for hydraulic fluid to cause the work attachment 12 to be selectively raised or lowered in a lifting function. The lowering speed of the lift cylinder(s) 40 can be a result of the flow through the second valve assembly 120. Flow through the second valve assembly 120 can be controlled by a pair of variable solenoid or voicecoil actuators 158, 160 acting on each end of the spool 124 of the valve 120. The variable solenoid or voicecoil actuators 158, 160 can be operated by the control system 50 via control lines 166, 170, respectively.

As shown, the second valve assembly 120 is a three-position, three-way valve in fluid communication with the pump 210, a tank reservoir 230, and the lift cylinder(s) 40. In the embodiment shown, second valve assembly 120 is movable from a closed or neutral position A, to a position B, and to position C. Positions B and C could be used for lifting or lowering, depending upon whether pump pressure is needed to prevent cavitation and whether the tank pressure is sufficient. In one embodiment, position B is typically used for lowering.

In the closed position A, ports 126A, 128A, and 130A of the second valve assembly 120 are closed such that the pump 210 and tank reservoir 230 are both isolated from the lifting cylinder(s) 40. In this position the work attachment 12 can generally be held in a static position and can be neither raised nor lowered. However, it the work attachment 12 could lower to some extent if the gravity load is such that a sufficient vacuum condition would be created. In one operational control scheme, the second valve assembly 120 would be in the closed position A when the first valve assembly 20 is also in its closed position A.

In the lowering position B, the second valve assembly 120 is positioned such that ports 126B and 130B are placed in fluid communication with each other. This position allows for the pump 210 to be placed in fluid communication with the lifting cylinder(s) 40 such that pump can provide fluid power to lower the load beyond what would be achieved by gravity alone. In the lowering position, the tank reservoir 230 is blocked at port 28B. In one operational control scheme, the second valve assembly 120 would be in the lowering position B when the first valve assembly 20 is also in its lowering position C.

In the lifting position C, the second valve assembly 120 is positioned such that ports 128C and 130C are placed in fluid communication with each other. This position allows for the tank reservoir 230 to be placed in fluid communication with the lifting cylinder(s) 40. The lifting position C allows for fluid to drain from the rod side of the lifting cylinder(s) 40 to the tank reservoir 230, thereby allowing for the load 44 to be raised. In one operational control scheme, the second valve assembly 120 would be in the lifting position C when the first valve assembly 20 is also in its lifting position B.

It is noted that the work machine 10 and work circuit 200 may contain a plurality of work sections, each of which including an actuator 40 and valves 20, 120 for performing various tasks of the work machine (e.g. lifting, side shift, tilt, etc.). In some examples, the valves 20, 120 are packaged together in a single housing assembly. In some examples, multiple housing assemblies are assembled together such that all of the valves associated with the work sections are provided as an overall assembly, as is the case for some models of the Eaton CMA Advanced Mobile Valve.

Figure 2B:
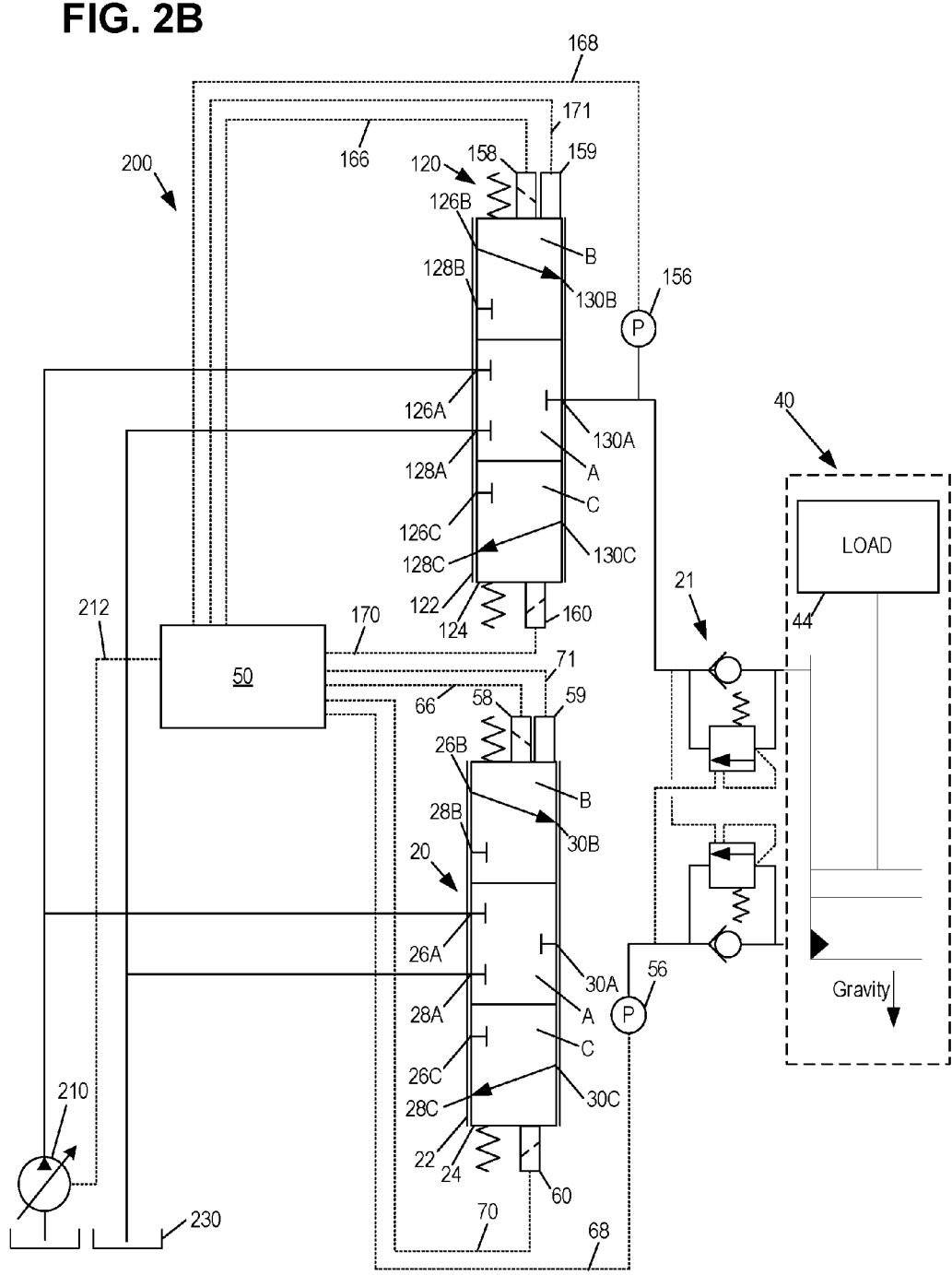
FIG. 2B is a schematic view of the system shown in FIG. 2 with the addition of a counterbalance valve assembly.

A similar system to that shown in FIG. 2 is shown at FIG. 2B. The only difference between the two shown systems is that the system shown in FIG. 2B additionally shows the presence of counterbalance valves. Counterbalance valves perform a safety function and prevent flow to the actuator unless pressure exists in the line on the opposite side of the actuator. Thus, if a hose bursts or fluid pressure is otherwise lost, the counterbalance valve will close and prevent fluid from entering or leaving the other side of the actuator to prevent the actuator from moving. While counterbalance valves provide a means for increasing safety, they also increase the difficulty in knowing the actual pressure at the actuator as they are installed between the pressure sensors 56, 156 and the actuator.

The Electronic Control System

The hydraulic system operates in various modes depending on demands placed on the work machine (e.g., by an operator). The electronic control system monitors and allows for the various modes to be initiated at appropriate times.

An electronic controller 50 monitors various sensors and operating parameters of the hydraulic system 214 to configure the hydraulic system 214 into the most appropriate mode. Examples of operational modes are a work circuit lifting mode and a fail operational mode.

Figure 3:
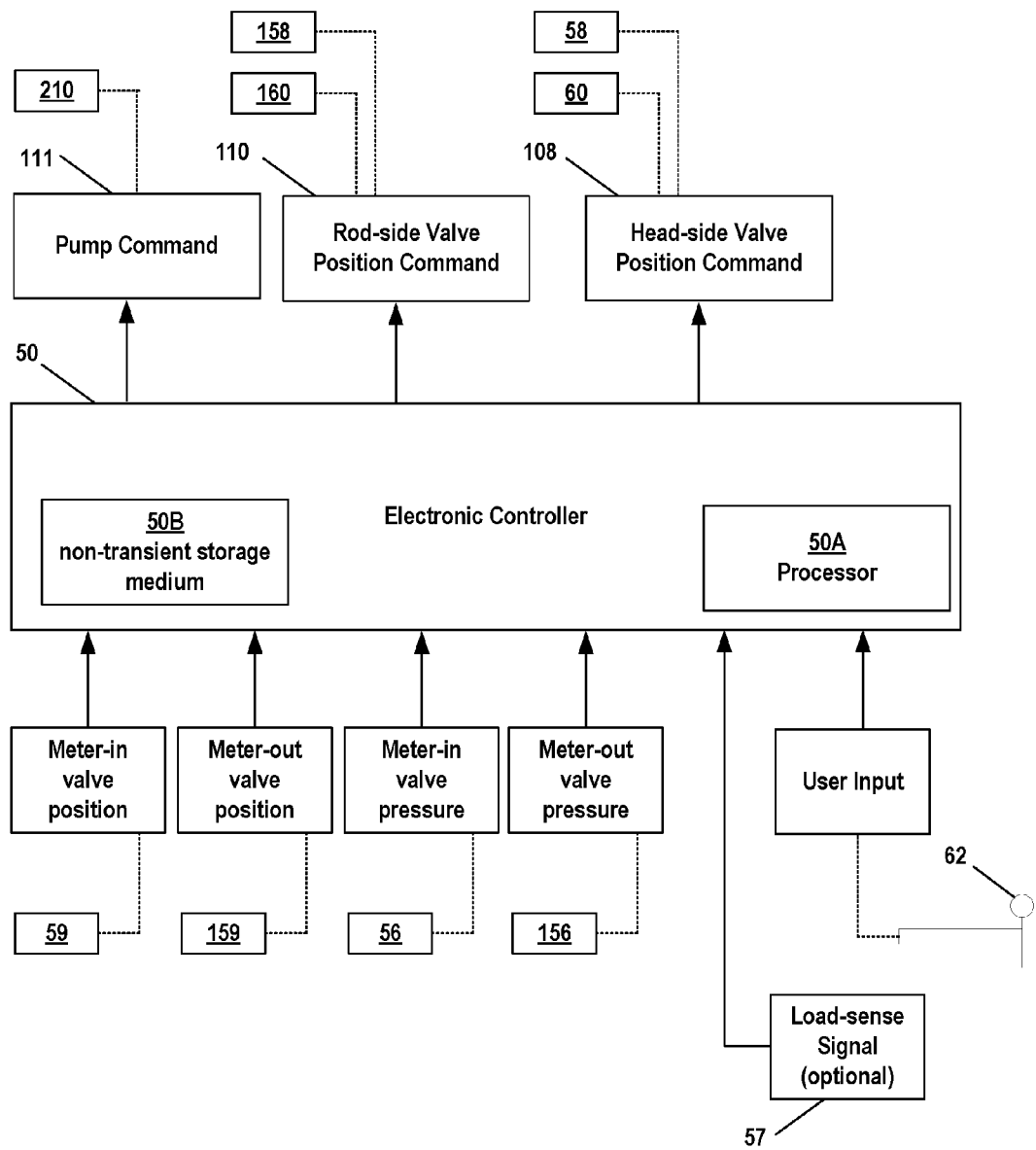
FIG. 3 is a schematic of an electronic control system for the hydraulic circuit shown in FIG. 2.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for implementing the work circuit lifting mode and the work circuit fail operational mode. For example, inputs and outputs may be in the form of pressure and position sensors on the first and second control valves 20, 120. Another example of an input is engine speed, which may be provided as a direct input into the electronic controller 50 or may be received from another portion of the control system via a control area network (CAN). The measured pump displacement, for example via a displacement feedback sensor, may also be provided.

One input into the electronic controller 50 is the lever position input from a lifting lever 62. In one embodiment, the lever position input is a direct digital signal from an electronic lever. The lifting lever 62 provides a user indication to the controller 50 that a load lifting operation by hydraulic lift cylinder(s) 40 is desired and also provides a means to control the raising and lowering of the load 44. Although lever 62 is characterized as a lifting lever, it should be understood that the disclosure is not limited to only lifting levers and that lever 62 can be any type of work lever without departing from the concepts disclosed herein. Other inputs to the controller are the signals from sensors 56, 59, 156, and 159. An optional load-sense signal 57 may also be provided to the controller or directly to the pump 210. In the embodiment shown, the load-sense demand is derived from the pressure sensors. The pressure and position inputs can also be used by the valve controller to calculate a flow rate through the valve itself.

Still referring to FIG. 3, a number of outputs from the electronic controller 50 are shown. One output is a valve position command 108 to the first control valve 20. In the particular embodiment shown, the valve command output 108 is a proportional signal to the solenoid or voicecoil valves 58, 60 of control valve 20 via control lines 66, 70. Another output is a valve position command 110 to the second control valve 120. In the particular embodiment shown, the valve command output 110 is a proportional signal to the solenoid or voicecoil valves 158, 160 of control valve 120 via control lines 166, 170. Another output may be a pump command output 111 to control the flow and/or pressure generated by the pump 210.

The electronic controller 50 may also include a number of algorithms or control schemes to correlate the inputs and outputs of the controller 502. In one embodiment, the controller 50 includes an algorithm to control the system in a work mode, as described further in the Method of Operation section below.

The electronic controller 50 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Method of Operation

Figure 4:
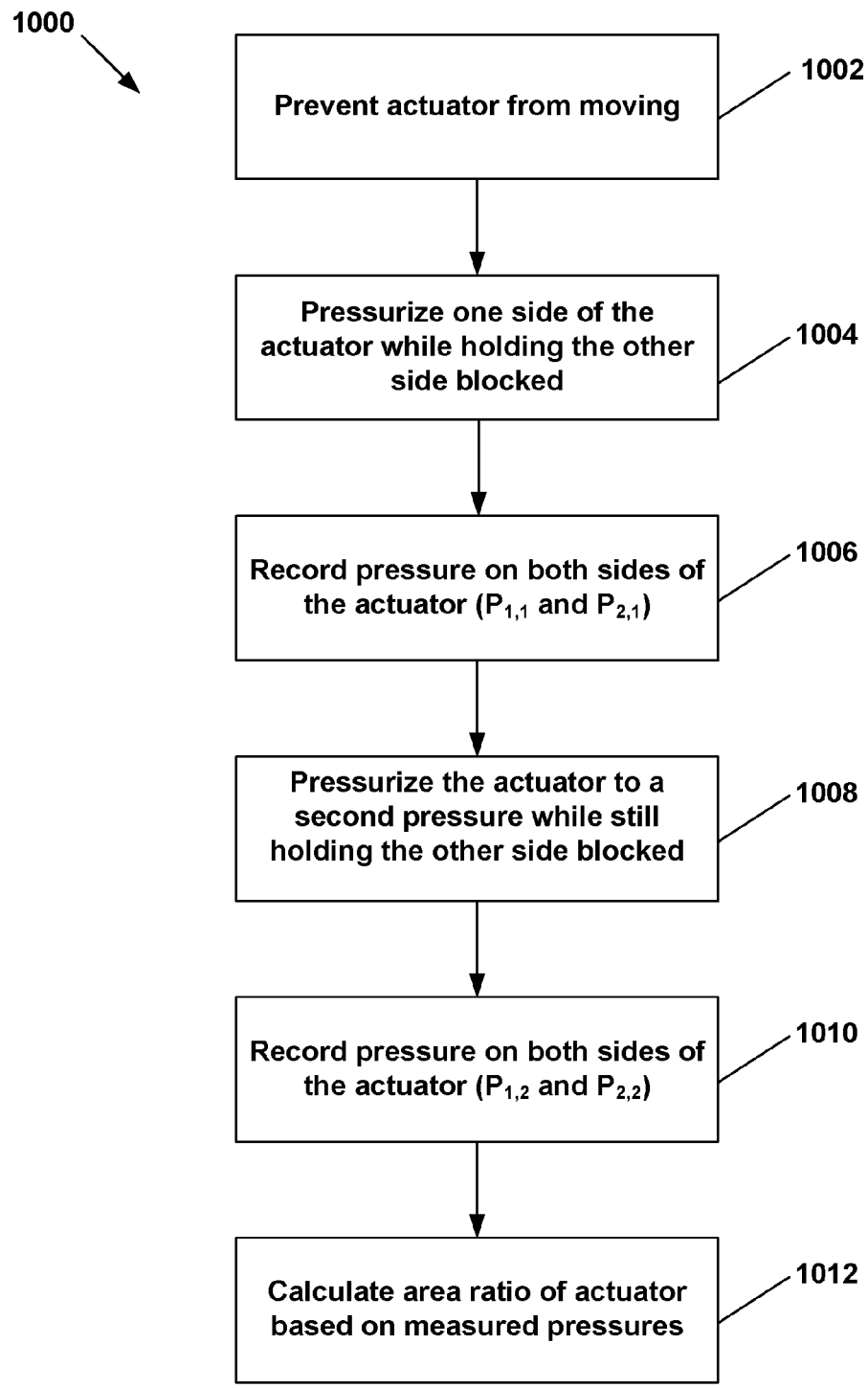
FIG. 4 is a flow chart representing a static calibration method of the system shown in FIG. 2.
Figure 5:
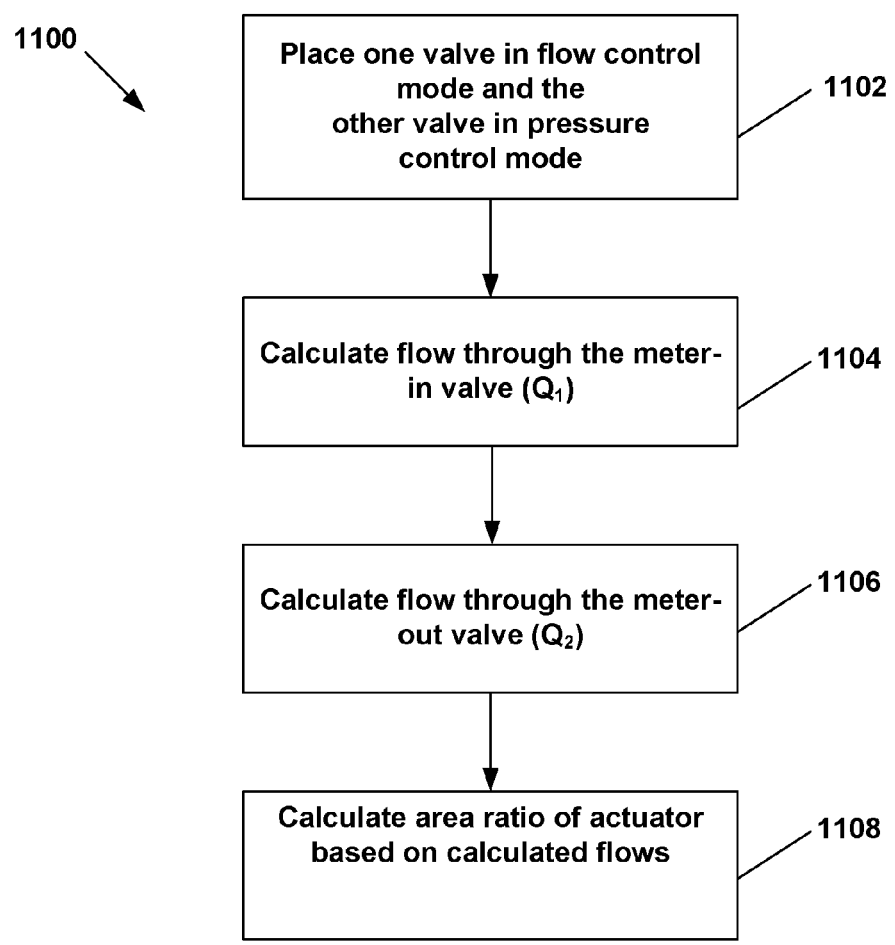
FIG. 5 is a flow chart representing a dynamic calibration method for the system shown in FIG. 2.
Figure 6:
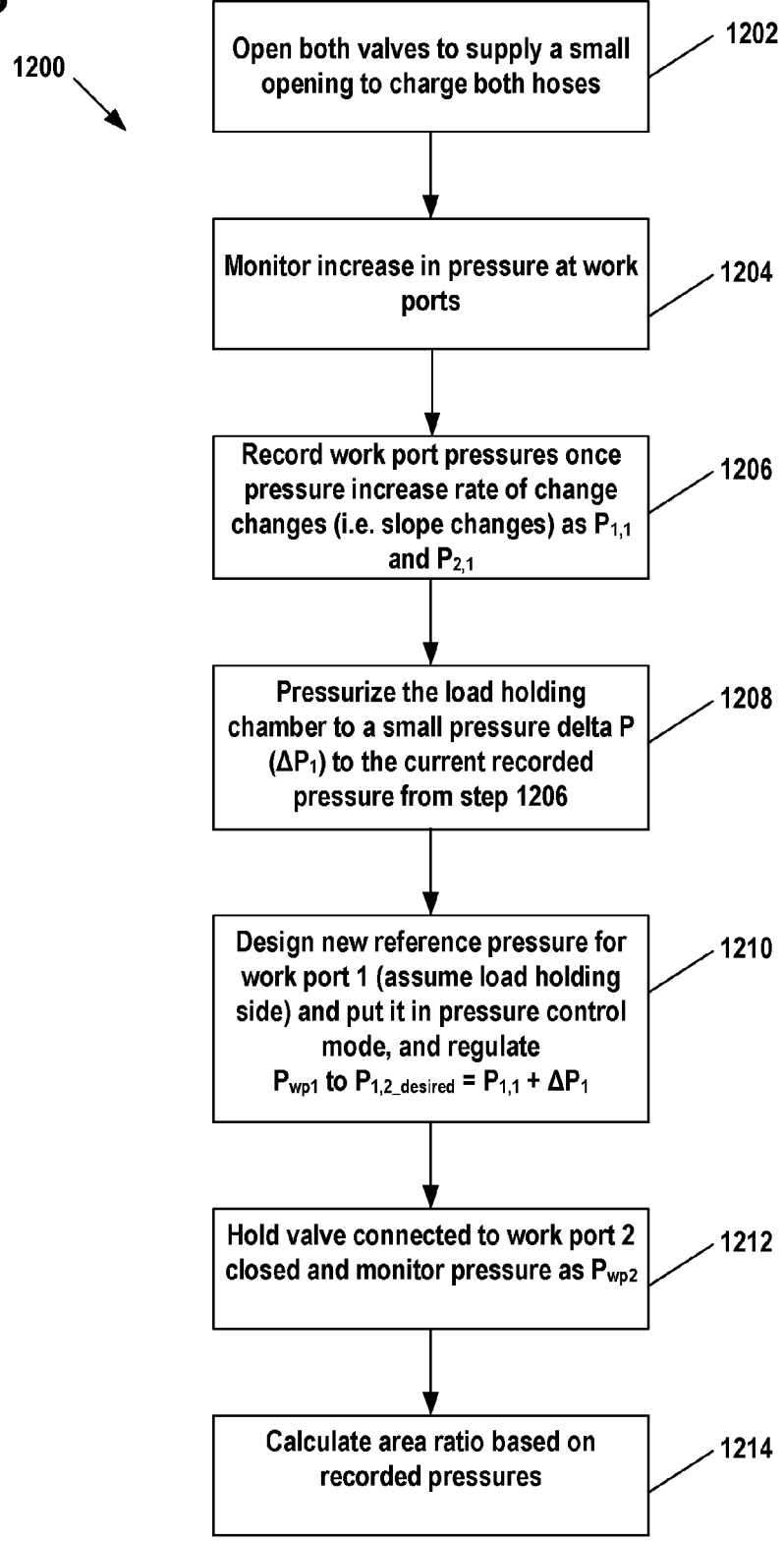
FIG. 6 is a flow chart representing a calibration method for the system shown in FIG. 2B.

Referring to FIGS. 4-6, methods 1000, 1100, 1200 are shown for determining the area ratio of the actuator 40 for the systems shown in FIGS. 2 (no counterbalance valves) and 2B (with counterbalance valves). These methods allow for the area ratio of the actuator connected to the valve to be automatically detected. This automatic determination can reduce set-up time and can allow for the attachment of unknown implements to the valve without requiring operator input. Additionally, these methods can also reduce set-up time for a new replacement valve being installed in an existing system and can automatically account for a new work implement being installed on the work machine. The general principle of the disclosed methods is that different pressures are applied to the actuator and the resulting pressure differences are measured on both sides of the actuator. The relationship of the relative pressure differences can be used to calculate the area ratio of the actuator, as discussed below.

Referring to FIG. 4, a method 1000 is shown. The method 1000 can be utilized with the system shown in FIG. 2, but is robust to the presence of counter-balance valves or PO-check valves, and thus could be applied to the system of FIG. 2B. In the later cases, it may be advantageous to first pressurize the actuator to a minimum pressure prior to executing the further described steps in the method. Method 1000 can be referred to as a static method as the actuator is prevented from moving during the test. In a step 1002, the actuator is secured to a static position such that no significant service movement is possible, although some movement due to fluid compressibility may be experienced. This can be accomplished by closing one of the valves associated with the actuator. In a step 1004, one side of the actuator is pressurized to a first pressure while the other side of the actuator is held blocked. For example, valve 20 is placed in a closed position, while valve 120 is opened for a period of time to increase the fluid pressure in the actuator or vice-versa. In a step 1006, after the actuator chamber pressure has stabilized, the pressure measured on both sides of the actuator is recorded as $P_{1,1}$ and $P_{2,1}$. Measurements from sensors 56, 156 can be used for this purpose. In a step 1008, the actuator is pressurized to a second pressure while still holding the other side of the actuator blocked. At step 1010, after the actuator chamber pressure has stabilized, the pressures on both sides of the actuator are again recorded as $P_{1,2}$ and $P_{2,2}$. At each of steps 1004 and 1008, it should be ensured that the actuator has not been moved to an end stop. Where the pressure one side of the actuator does not rise during the test, it may be an indication that this has occurred. Also, it is desirable to pressurize the non-load holding side of the actuator, but either side can be pressurized, as desired. This approach best keeps friction constant so that any influence on the area ratio calculation is minimized to the furthest extent possible.

At a step 1012, the area ratio of the actuator based on the measured pressures is performed. As a basic principle, the following equation applies to an actuator system:

$$A_1 P_1 - A_2 P_2 = F_{load} + F_{friction}$$

In the above equation, $A_1$ and $P_1$ are respectively the area and pressure of one side of the actuator (e.g. head-side area) while $A_2$ and $P_2$ are respectively the area and pressure of the other side of the actuator (e.g. head-side area). $F_{load}$ is the force of the load exerted onto the actuator and $F_{friction}$ is the friction that exists within the system. When multiple pressures are recorded using the method 1000, the friction components, which are assumed constant, cancel out and the following equation can be developed to determine the actuator area ratio, which can be expressed as $A_1$ over $A_2$:

$$\frac{A_1}{A_2} = \frac{P_{2,1} - P_{2,2}}{P_{1,1} - P_{1,2}} = \frac{\Delta P_2}{\Delta P_1}$$

Although method 1000 shows determining the area ratio at two different pressures, the test can be repeated at further different pressures. The additional data points can be used to obtain an average area ratio to increase accuracy of the result.

Figure 7:
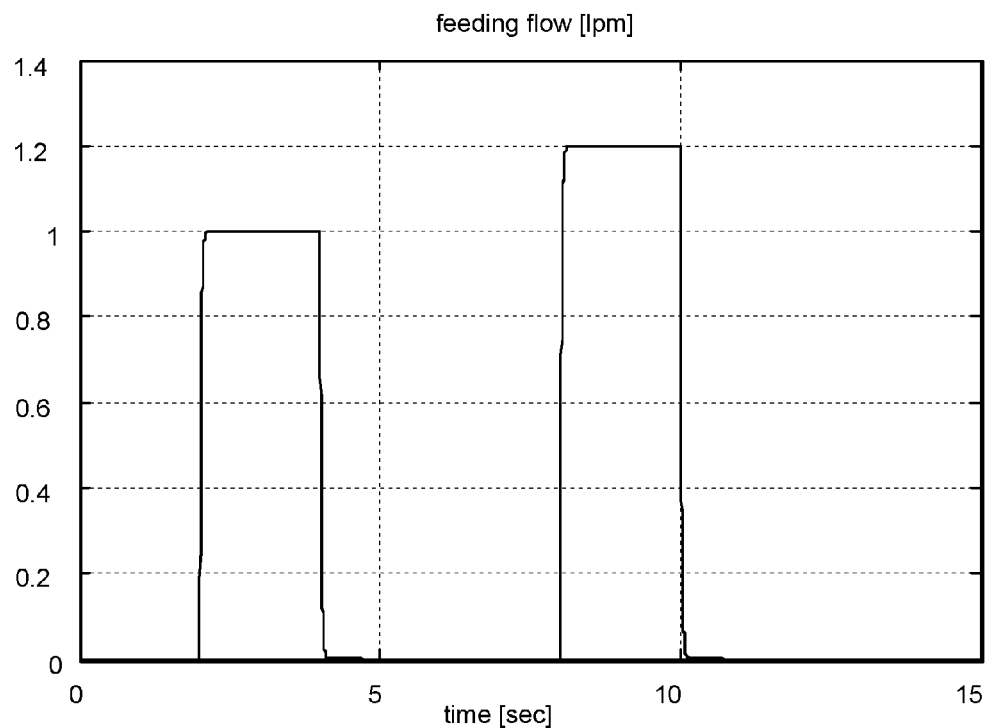
FIG. 7 is a graph showing a simulation of fluid flow into an actuator while executing the method of FIG. 4.
Figure 8:
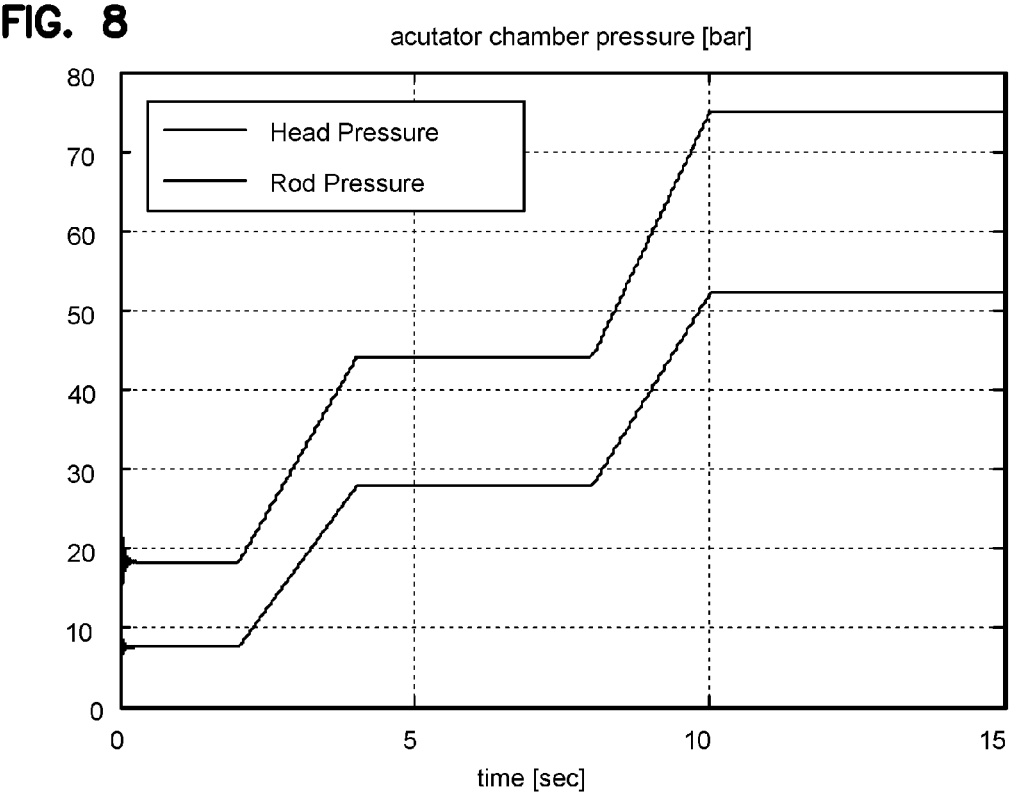
FIG. 8 is a graph showing a simulation of actuator chamber pressure while executing the method of FIG. 4.
Figures 9, 10:
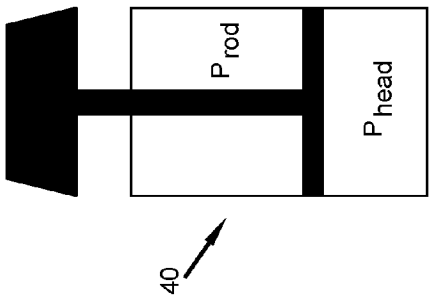
FIG. 9 is a schematic representation of the actuator assembly shown in FIG. 4 with dimension data for the head and rod shown.
FIG. 10 is a table showing simulation results from the application of the method of FIG. 4 over a range of different conditions.

Referring to FIGS. 7-10, simulation results relating to method 1000 are shown. FIG. 7 shows a graph showing fluid flow into the actuator being applied to pressurize the actuator at two discrete points corresponding to steps 1004 and 1008 in the method, wherein the valve is incrementally opened for a period of time and then closed. As shown, the period of time is about two seconds. In examples, the period of time can be a predetermined period of time or can be a function of a pressure set point. FIG. 8 shows the corresponding head-side and rod-side pressure changes which rise when fluid is being fed into the actuator and stabilize after fluid flow is stopped. FIG. 9 shows the actuator head and rod size with the actual diameters for the head and rod from which the actual area ratio can be calculated. In this instance, the area ratio is 1.273. FIG. 10 shows the results from utilizing method 1000 to estimate the area ratio under a variety of different conditions (e.g. hose diameter (D), hose length (L), bulk modulus (Air), fluid temperature (Temp)). As can be seen, the application of method 1000 results in an estimated area ratio of 1.273 under all conditions and thus represents an accurate means by which the area ratio can be determined when the actual actuator parameters are not known.

Referring to FIG. 5, a method 1100 is shown. Method 1100 can be referred to as a dynamic test as the actuator is not required to be static in order to determine the actuator area ratio. Method 1100 is applicable for the system of FIG. 2 and is ideally performed when the actuator is in a passive state (e.g. actuator force is opposite direction of load force), but can be used in an overrunning condition (e.g. actuator force in same direction as load force). In a step 1102 one of the valves is placed in a flow control mode and the other valve is placed in a pressure control mode. In one example, the meter-in side operates in a flow control mode to control the motion of the actuator, and the meter-out side operates in a pressure control mode to guarantee a low meter out pressure. The meter-in and meter-out valves can be controlled in other modes as well without departing from the concepts herein. The meter-in valve is the valve from which fluid is being fed through the valve and to the actuator while the meter-out valve is the valve to which fluid flows from the opposite side of the actuator. The valves switch between these two designations depending upon the desired directional control of the actuator. By use of the term "flow control mode" it is meant to indicate that the valve is controlled to maintain a fluid flow setpoint. By use of the term "pressure control mode" it is meant to indicate that the valve is controlled to maintain a fluid pressure setpoint. By use of the term "passive condition" it is meant to indicate that the load is being forced in a direction by the actuator that is generally opposite the direction of an external opposing force, such as gravity (e.g. such as when a load is being lifted). Ideally, the test is performed when the actuator is moving at a constant speed.

In a step 1104, the flow through the meter-in valve is calculated and recorded as $Q_{in}$. The flow can be calculated from the position of the valve via the LVDT position sensor 59/159 and the pressure in the valve via pressure sensor 56, 156. In a step 1106, the flow through the meter-out valve is calculated and recorded as $Q_{out}$. At step 1108 the area ratio of the actuator is calculated based on the calculated flows. The ratio of flows $Q_{in}/Q_{out}$ is equal to the area ratio $A_1/A_2$.

This approach may have initially poor performance but subsequent iterations can be used to improve the result. To improve accuracy, the error term when achieving pressure control of one of the valves can be observed. If the pressure controller has a flow feed-forward term, any feedback terms needed to achieve pressure control can be used to adjust the area ratio estimate. The procedure could also have a "learning time" that allows area ratio estimation for a certain amount of use. After this period, the area ratio is saved and error terms can be used for fault detection.

Referring to FIG. 6, a method 1200 is shown that is applicable to the system shown in FIG. 2B, which includes counterbalance valves. As the counterbalance valves 21 are shown as being between the actuator 40 and the pressure sensors 56, 156 the pressure in the actuator chambers cannot be directly measured. Thus, a modified strategy for such a configuration can be advantageous. Method 1200 can also be used where counterbalance valves are not present. Method 1200 is ideally performed with the actuator in a static state, but can be performed in a dynamic condition.

Figure 11:
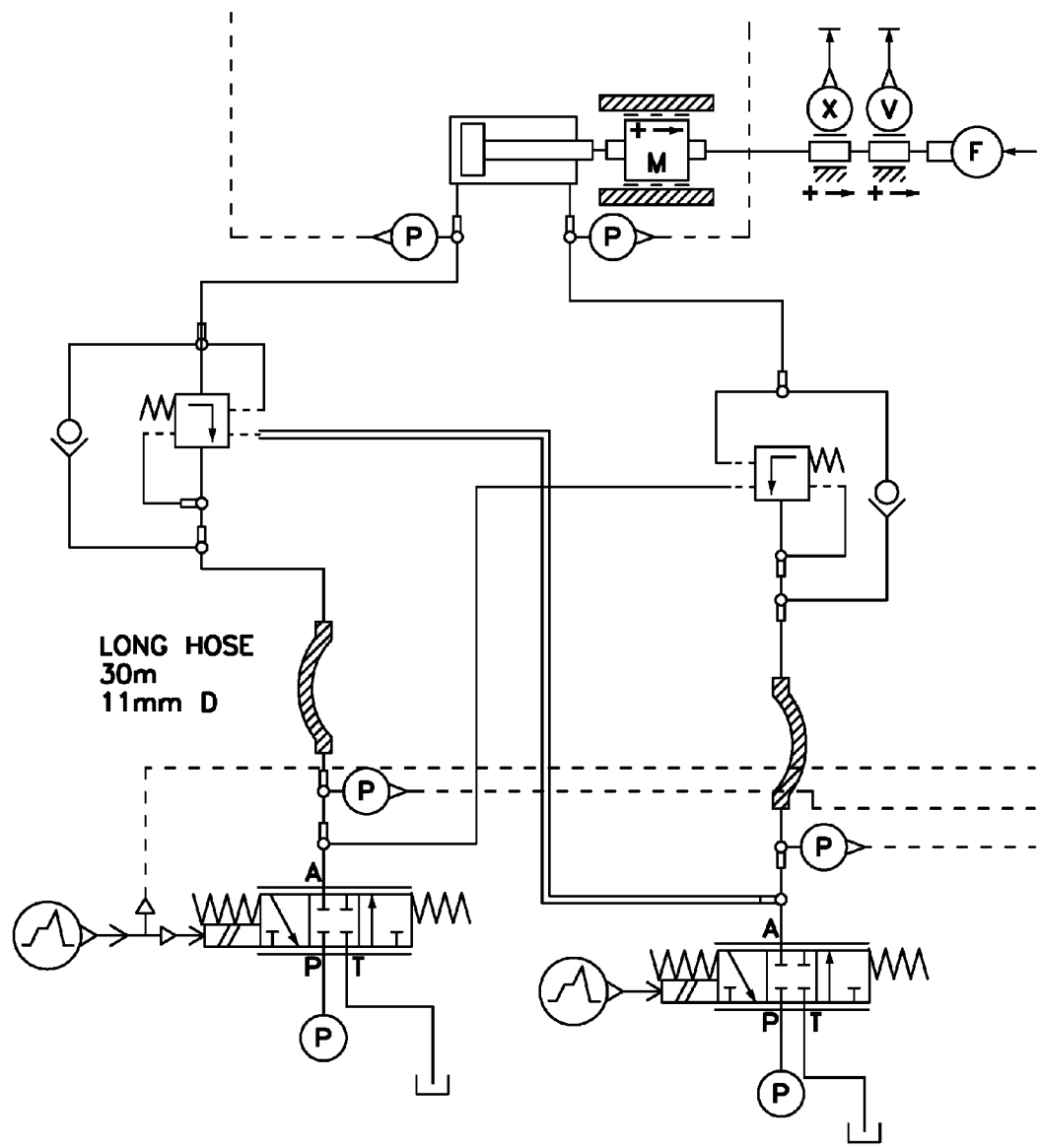
FIG. 11 is a schematic representation of a system used to simulate the system of FIG. 4 used to model the method of FIG. 6.

In a first step 1202 of the method, both valves are opened to supply a small opening to charge both hoses. In a second step 1204, the work port pressures are monitored. At some point, the pressure raising slope will change indicating that the work port pressure of the valves is equalizing with the chamber pressures of the actuator. Once this occurs, the pressures at the work ports, as measured at 56/156 are recorded at step 1206. In a step 1208, the load holding chamber is pressurized to a small change in pressure $\Delta P_1$ to the current recorded pressure from step 1206. At a step 1208, a new reference pressure for work port 1 (assume load holding side) is designed and the valve associated with the load holding side work port is placed in a pressure control mode, wherein $P_{wp1}$ is regulated to $P_{1,2\ desired}=P_{1,1}+\Delta P_1$. During this time, the other valve (i.e. valve associated with work port 2) is held closed and pressure is monitored as $P_{wp2}$. At a step 1214, the area ratio is calculated based on the measured pressures with the same calculation approach as described for method 1000. Referring to FIGS. 11 and 12, a schematic representation of a simulation for method 1200 is shown, wherein the system model is shown at FIG. 11 and the results, with and without the presence of counterbalance valves, is shown at FIG. 12. In this simulation, the cylinder head side diameter was modeled at 27 mm and the cylinder rod diameter was modeled at 16 mm for an actual area ratio of 1.5412. The presence of 30 meters of 11 mm inner diameter hose was also modeled. The total volume modeled includes the hose volume, dead volume in the cylinder, and the volume due to initial placement. The fluid was modeled as including 5% air and being at 50° C. As can be seen at FIG. 12, the results of the application of the method without the presence of counterbalance valves resulted in an estimated area ratio completely matching the true area ratio. Where counterbalance valves were modeled, the area ratio estimation was within 0.16% of the known, true area ratio, and thus represents a highly effective approach.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for estimating the area ratio of an actuator connected to a first metering valve on a first side of the actuator and a second metering valve on a second side of the actuator, the method comprising the steps of:
   (a) holding the first metering valve in a closed position;
   (b) opening the second metering valve to pressurize the actuator to a first pressure;
   (c) closing the second metering valve;
   (d) recording the pressure at the first and second sides of the actuator;
   (e) opening the second metering valve to pressurize the actuator to a second pressure;
   (f) closing the second metering valve;
   (g) recording the pressure at the first and second sides of the actuator; and
   (h) calculating the area ratio of the actuator based on the recorded pressures.

2. The method for estimating the area ratio of an actuator of claim 1, wherein the method is repeated at different pressures and includes determining the area ratio as an average of the calculated area ratios.

3. The method for estimating the area ratio of an actuator of claim 1, wherein the actuator is a linear actuator and the first side is a head-side of the actuator and the second side is a rod-side of the actuator.

4. The method for estimating the area ratio of an actuator of claim 1, wherein the first valve is associated with a non-load holding side of the actuator.

5. The method for estimating the area ratio of an actuator of claim 1, further including pressurizing the actuator to a minimum pressure before the step of opening the second metering valve to pressurize the actuator to the first pressure.

6. The method for estimating the area ratio of an actuator of claim 1, wherein the step of opening the second metering valve to pressurize the actuator to a first pressure includes opening the second metering valve for a first predetermined period of time.

7. The method for estimating the area ratio of an actuator of claim 6, wherein the step of opening the second metering valve to pressurize the actuator to a second pressure includes opening the second metering valve for a second predetermined period of time.

8. The method for estimating the area ratio of an actuator of claim 7, wherein the first and second predetermined period of time are equal.

* * * * *